US011265443B2

(12) United States Patent
Crounse

(10) Patent No.: US 11,265,443 B2
(45) Date of Patent: Mar. 1, 2022

(54) SYSTEM FOR RENDERING COLOR IMAGES

(71) Applicant: E Ink Corporation, Billerica, MA (US)

(72) Inventor: Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 19 days.

(21) Appl. No.: 17/007,390

(22) Filed: Aug. 31, 2020

(65) Prior Publication Data

US 2020/0404121 A1 Dec. 24, 2020

Related U.S. Application Data

(63) Continuation of application No. 16/731,160, filed on Dec. 31, 2019, now Pat. No. 10,771,652, which is a continuation of application No. 16/280,306, filed on Feb. 20, 2019, now Pat. No. 10,554,854, which is a
(Continued)

(51) Int. Cl.
| | |
|---|---|
| H04N 1/405 | (2006.01) |
| G09G 3/20 | (2006.01) |
| H04N 1/52 | (2006.01) |
| H04N 1/60 | (2006.01) |
| G09G 3/34 | (2006.01) |

(52) U.S. Cl.
CPC ........... H04N 1/405 (2013.01); G09G 3/2051 (2013.01); G09G 3/2059 (2013.01); H04N 1/52 (2013.01); H04N 1/60 (2013.01); G09G 3/344 (2013.01); G09G 2340/06 (2013.01)

(58) Field of Classification Search
None
See application file for complete search history.

(56) References Cited

U.S. PATENT DOCUMENTS

| | | |
|---|---|---|
| 4,843,460 A | 6/1989 | Le Guet et al. |
| 5,930,026 A | 7/1999 | Jacobson |
| 5,933,150 A | 8/1999 | Ngo et al. |
| (Continued) | | |

OTHER PUBLICATIONS

Arad, Nur et al., "Barycentric Screening", Hewlett Packard Computer Peripherals Laboratory, HPL-97-103(R.1), Nov. 1999).
(Continued)

*Primary Examiner* — Anh-Vinh Thi Nguyen
(74) *Attorney, Agent, or Firm* — Brian D. Bean

(57) ABSTRACT

An image is rendered on a display having a limited number of primary colors by (104) combining input data representing the color of a pixel to be rendered with error data to form modified input data, determining in a color space the simplex (208—typically a tetrahedron) enclosing the modified input data and the primary colors associated with the simplex, converting (210) the modified image data to barycentric coordinates based upon the primary colors associated with the simplex and (212) setting output data to the primary having the largest barycentric coordinate. calculating (214) the difference between the modified input data and the output data for the pixel, thus generating error data, applying (106) this error data to at least one later-rendered pixel, and applying the output data to the display and thus rendering the image on the display. Apparatus and computer-storage media for carrying out this process are also provided.

8 Claims, 2 Drawing Sheets

Related U.S. Application Data continuation of application No. 15/592,515, filed on May 11, 2017, now Pat. No. 10,270,939.

(60) Provisional application No. 62/340,803, filed on May 24, 2016.

(56) References Cited

U.S. PATENT DOCUMENTS

| | | | |
|---|---|---|---|
| 5,936,633 A | 8/1999 | Aono et al. | |
| 6,017,584 A | 1/2000 | Albert et al. | |
| 6,144,773 A * | 11/2000 | Kolarov | G06T 9/40 375/E7.072 |
| 6,268,939 B1 | 7/2001 | Klassen et al. | |
| 6,304,333 B1 * | 10/2001 | Shaked | H04N 1/52 358/1.1 |
| 6,373,489 B1 | 4/2002 | Lu et al. | |
| 6,445,489 B1 | 9/2002 | Jacobson et al. | |
| 6,504,524 B1 | 1/2003 | Gates et al. | |
| 6,512,354 B2 | 1/2003 | Jacobson et al. | |
| 6,531,997 B1 | 3/2003 | Gates et al. | |
| 6,545,797 B2 | 4/2003 | Chen et al. | |
| 6,577,317 B1 | 6/2003 | Duluk, Jr. et al. | |
| 6,664,944 B1 | 12/2003 | Albert et al. | |
| 6,753,999 B2 | 6/2004 | Zehner et al. | |
| 6,788,452 B2 | 9/2004 | Liang et al. | |
| 6,825,970 B2 | 11/2004 | Goenaga et al. | |
| 6,864,875 B2 | 3/2005 | Drzaic et al. | |
| 6,891,548 B2 | 5/2005 | Alcorn et al. | |
| 6,900,851 B2 | 5/2005 | Morrison et al. | |
| 6,914,714 B2 | 7/2005 | Chen et al. | |
| 6,937,365 B2 | 8/2005 | Gorian et al. | |
| 6,972,893 B2 | 12/2005 | Chen et al. | |
| 6,995,550 B2 | 2/2006 | Jacobson et al. | |
| 7,012,600 B2 | 3/2006 | Zehner et al. | |
| 7,023,420 B2 | 4/2006 | Comiskey et al. | |
| 7,027,660 B2 | 4/2006 | Hersch et al. | |
| 7,034,783 B2 | 4/2006 | Gates et al. | |
| 7,038,656 B2 | 5/2006 | Liang et al. | |
| 7,038,670 B2 | 5/2006 | Liang et al. | |
| 7,046,228 B2 | 5/2006 | Liang et al. | |
| 7,052,571 B2 | 5/2006 | Wang et al. | |
| 7,053,894 B2 | 5/2006 | Grzeszczuk et al. | |
| 7,054,038 B1 | 5/2006 | Ostromoukhov et al. | |
| 7,061,166 B2 | 6/2006 | Kuniyasu | |
| 7,061,662 B2 | 6/2006 | Chung et al. | |
| 7,062,419 B2 | 6/2006 | Grzeszczuk et al. | |
| 7,075,502 B1 | 7/2006 | Drzaic et al. | |
| 7,116,466 B2 | 10/2006 | Whitesides et al. | |
| 7,119,772 B2 | 10/2006 | Amundson et al. | |
| 7,167,155 B1 | 1/2007 | Albert et al. | |
| 7,177,066 B2 | 2/2007 | Chung et al. | |
| 7,193,625 B2 | 3/2007 | Danner et al. | |
| 7,202,847 B2 | 4/2007 | Gates | |
| 7,236,649 B2 | 6/2007 | Fenney | |
| 7,242,514 B2 | 7/2007 | Chung et al. | |
| 7,259,744 B2 | 8/2007 | Arango et al. | |
| 7,265,870 B2 | 9/2007 | Velde et al. | |
| 7,304,787 B2 | 12/2007 | Whitesides et al. | |
| 7,312,794 B2 | 12/2007 | Zehner et al. | |
| 7,327,511 B2 | 2/2008 | Whitesides et al. | |
| 7,330,193 B2 | 2/2008 | Bhattacharjya | |
| 7,355,597 B2 | 4/2008 | Laidlaw et al. | |
| 7,385,751 B2 | 6/2008 | Chen et al. | |
| 7,408,548 B2 * | 8/2008 | Guenter | G06T 17/20 345/420 |
| 7,408,699 B2 | 8/2008 | Wang et al. | |
| 7,423,791 B2 | 9/2008 | Tin | |
| 7,453,445 B2 | 11/2008 | Amundson | |
| 7,466,314 B2 | 12/2008 | Loop et al. | |
| 7,492,339 B2 | 2/2009 | Amundson | |
| 7,492,505 B2 | 2/2009 | Liang et al. | |
| 7,528,822 B2 | 5/2009 | Amundson et al. | |
| 7,545,358 B2 | 6/2009 | Gates et al. | |
| 7,583,251 B2 | 9/2009 | Arango et al. | |
| 7,602,374 B2 | 10/2009 | Zehner et al. | |
| 7,612,760 B2 | 11/2009 | Kawai | |
| 7,623,739 B2 | 11/2009 | Hersch et al. | |
| 7,659,920 B2 | 2/2010 | Cohen et al. | |
| 7,667,684 B2 | 2/2010 | Jacobson et al. | |
| 7,679,599 B2 | 3/2010 | Kawai | |
| 7,679,813 B2 | 3/2010 | Liang et al. | |
| 7,683,606 B2 | 3/2010 | Kang et al. | |
| 7,684,108 B2 | 3/2010 | Wang et al. | |
| 7,688,297 B2 | 3/2010 | Zehner et al. | |
| 7,728,845 B2 | 6/2010 | Holub | |
| 7,729,039 B2 | 6/2010 | LeCain et al. | |
| 7,733,311 B2 | 6/2010 | Amundson et al. | |
| 7,733,335 B2 | 6/2010 | Zehner et al. | |
| 7,737,989 B2 | 6/2010 | Pettitt et al. | |
| 7,787,169 B2 | 8/2010 | Abramson et al. | |
| 7,787,653 B2 | 8/2010 | Rhoads | |
| 7,791,789 B2 | 9/2010 | Albert et al. | |
| 7,800,628 B2 | 9/2010 | Harville et al. | |
| 7,800,813 B2 | 9/2010 | Wu et al. | |
| 7,821,702 B2 | 10/2010 | Liang et al. | |
| 7,839,564 B2 | 11/2010 | Whitesides et al. | |
| 7,854,518 B2 | 12/2010 | Culbertson et al. | |
| 7,859,742 B1 | 12/2010 | Chiu et al. | |
| 7,868,887 B1 | 1/2011 | Yhann | |
| 7,907,792 B2 | 3/2011 | Harville | |
| 7,910,175 B2 | 3/2011 | Webber | |
| 7,911,651 B2 | 3/2011 | Ostromoukhov et al. | |
| 7,924,278 B2 | 4/2011 | Loop et al. | |
| 7,952,557 B2 | 5/2011 | Amundson | |
| 7,952,790 B2 | 5/2011 | Honeyman | |
| 7,956,841 B2 | 6/2011 | Albert et al. | |
| 7,982,479 B2 | 7/2011 | Wang et al. | |
| 7,982,941 B2 | 7/2011 | Lin et al. | |
| 7,999,787 B2 | 8/2011 | Amundson et al. | |
| 7,999,966 B2 | 8/2011 | Fritz et al. | |
| 8,040,357 B1 | 10/2011 | Hutchins et al. | |
| 8,040,594 B2 | 10/2011 | Paolini, Jr. et al. | |
| 8,054,526 B2 | 11/2011 | Bouchard | |
| 8,077,141 B2 | 12/2011 | Duthaler et al. | |
| 8,085,438 B2 | 12/2011 | Hersch et al. | |
| 8,098,418 B2 | 1/2012 | Paolini, Jr. et al. | |
| 8,125,501 B2 | 2/2012 | Amundson et al. | |
| 8,139,050 B2 | 3/2012 | Jacobson et al. | |
| 8,159,636 B2 | 4/2012 | Sun et al. | |
| 8,174,490 B2 | 5/2012 | Whitesides et al. | |
| 8,213,076 B2 | 7/2012 | Albert et al. | |
| 8,243,013 B1 | 8/2012 | Sprague et al. | |
| 8,274,472 B1 | 9/2012 | Wang et al. | |
| 8,289,250 B2 | 10/2012 | Zehner et al. | |
| 8,300,006 B2 | 10/2012 | Zhou et al. | |
| 8,300,979 B2 | 10/2012 | Ordentlich et al. | |
| 8,305,341 B2 | 11/2012 | Arango et al. | |
| 8,314,784 B2 | 11/2012 | Ohkami et al. | |
| 8,363,299 B2 | 1/2013 | Paolini, Jr. et al. | |
| 8,373,649 B2 | 2/2013 | Low et al. | |
| 8,384,658 B2 | 2/2013 | Albert et al. | |
| 8,422,116 B2 | 4/2013 | Sprague et al. | |
| 8,441,714 B2 | 5/2013 | Paolini, Jr. et al. | |
| 8,441,716 B2 | 5/2013 | Paolini, Jr. et al. | |
| 8,456,414 B2 | 6/2013 | Lin et al. | |
| 8,462,102 B2 | 6/2013 | Wong et al. | |
| 8,466,852 B2 | 6/2013 | Drzaic et al. | |
| 8,503,063 B2 | 8/2013 | Sprague | |
| 8,514,168 B2 | 8/2013 | Chung et al. | |
| 8,514,932 B2 | 8/2013 | Stefanowski et al. | |
| 8,537,105 B2 | 9/2013 | Chiu et al. | |
| 8,558,783 B2 | 10/2013 | Wilcox et al. | |
| 8,558,785 B2 | 10/2013 | Zehner et al. | |
| 8,558,786 B2 | 10/2013 | Lin | |
| 8,558,833 B1 | 10/2013 | Moreton | |
| 8,558,855 B2 | 10/2013 | Sprague et al. | |
| 8,576,164 B2 | 11/2013 | Sprague et al. | |
| 8,576,259 B2 | 11/2013 | Lin et al. | |
| 8,576,470 B2 | 11/2013 | Paolini, Jr. et al. | |
| 8,576,475 B2 | 11/2013 | Huang et al. | |
| 8,576,476 B2 | 11/2013 | Telfer et al. | |
| 8,593,396 B2 | 11/2013 | Amundson et al. | |
| 8,593,708 B2 | 11/2013 | Monga et al. | |

(56) References Cited

U.S. PATENT DOCUMENTS

| | | |
|---|---|---|
| 8,593,721 B2 | 11/2013 | Albert et al. |
| 8,605,032 B2 | 12/2013 | Liu et al. |
| 8,605,354 B2 | 12/2013 | Zhang et al. |
| 8,619,085 B2 | 12/2013 | Keall et al. |
| 8,630,022 B2 | 1/2014 | Lin et al. |
| 8,643,595 B2 | 2/2014 | Chung et al. |
| 8,649,084 B2 | 2/2014 | Wang et al. |
| 8,665,206 B2 | 3/2014 | Lin et al. |
| 8,665,296 B2 | 3/2014 | Zulch |
| 8,670,174 B2 | 3/2014 | Sprague et al. |
| 8,681,191 B2 | 3/2014 | Yang et al. |
| 8,704,756 B2 | 4/2014 | Lin |
| 8,717,664 B2 | 5/2014 | Wang et al. |
| 8,730,153 B2 | 5/2014 | Sprague et al. |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,922,580 B2 * | 12/2014 | Morovic ............... G09G 5/06 345/601 |
| 8,928,562 B2 | 1/2015 | Gates et al. |
| 8,928,641 B2 | 1/2015 | Chiu et al. |
| 8,941,662 B2 | 1/2015 | Pfeifle |
| 8,964,282 B2 | 2/2015 | Wang et al. |
| 8,976,444 B2 | 3/2015 | Zhang et al. |
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,116,412 B2 | 8/2015 | Lin |
| 9,137,504 B2 | 9/2015 | Gelb et al. |
| 9,146,439 B2 | 9/2015 | Zhang |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,171,508 B2 | 10/2015 | Sprague et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,268,191 B2 | 2/2016 | Paolini, Jr. et al. |
| 9,269,311 B2 | 2/2016 | Amundson |
| 9,285,649 B2 | 3/2016 | Du et al. |
| 9,293,511 B2 | 3/2016 | Jacobson et al. |
| 9,299,294 B2 | 3/2016 | Lin et al. |
| 9,311,890 B2 | 4/2016 | Morovic et al. |
| 9,341,916 B2 | 5/2016 | Telfer et al. |
| 9,360,733 B2 | 6/2016 | Wang et al. |
| 9,361,836 B1 | 6/2016 | Telfer et al. |
| 9,383,623 B2 | 7/2016 | Lin et al. |
| 9,412,197 B2 | 8/2016 | Goel et al. |
| 9,423,666 B2 | 8/2016 | Wang et al. |
| 9,459,510 B2 | 10/2016 | Lin |
| 9,495,918 B2 | 11/2016 | Harrington et al. |
| 9,501,860 B2 | 11/2016 | Barringer et al. |
| 9,513,527 B2 | 12/2016 | Chan et al. |
| 9,530,241 B2 | 12/2016 | Engh-Halstvedt et al. |
| 9,541,814 B2 | 1/2017 | Lin et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington |
| 9,671,668 B2 | 6/2017 | Chan et al. |
| 9,672,766 B2 | 6/2017 | Sjodin |
| 9,691,333 B2 | 6/2017 | Cheng et al. |
| 9,697,778 B2 | 7/2017 | Telfer et al. |
| 9,721,495 B2 | 8/2017 | Harrington et al. |
| 9,740,076 B2 | 8/2017 | Paolini, Jr. et al. |
| 9,759,980 B2 | 9/2017 | Du et al. |
| 9,792,861 B2 | 10/2017 | Chang et al. |
| 9,792,862 B2 | 10/2017 | Hung et al. |
| 9,812,073 B2 | 11/2017 | Lin et al. |
| 9,966,018 B2 | 5/2018 | Gates et al. |
| 10,162,242 B2 | 12/2018 | Wang et al. |
| 10,209,556 B2 | 2/2019 | Rosenfeld et al. |
| 10,229,641 B2 | 3/2019 | Yang et al. |
| 10,319,313 B2 | 6/2019 | Harris et al. |
| 10,339,876 B2 | 7/2019 | Lin et al. |
| 10,353,266 B2 | 7/2019 | Bouchard et al. |
| 10,672,350 B2 | 6/2020 | Amundson et al. |
| 2003/0021437 A1 | 1/2003 | Hersch et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2005/0254073 A1 * | 11/2005 | Braun .................. H04N 1/60 358/1.9 |
| 2006/0132815 A1 * | 6/2006 | Lofthus ............... G06F 3/1284 358/1.13 |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2007/0216930 A1 * | 9/2007 | Jacobs ................ G06K 15/00 358/1.14 |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048970 A1 | 2/2008 | Drzaic et al. |
| 2008/0136774 A1 | 6/2008 | Harris et al. |
| 2008/0186390 A1 * | 8/2008 | Sato .................. G06T 3/4053 348/222.1 |
| 2008/0303780 A1 | 12/2008 | Sprague et al. |
| 2009/0174651 A1 | 7/2009 | Jacobson et al. |
| 2009/0195758 A1 | 8/2009 | Sobel et al. |
| 2009/0202150 A1 | 8/2009 | Fradkin et al. |
| 2009/0213144 A1 * | 8/2009 | Dokken ................ G06T 15/08 345/660 |
| 2009/0225398 A1 | 9/2009 | Duthaler et al. |
| 2009/0322721 A1 | 12/2009 | Zehner et al. |
| 2010/0085452 A1 * | 4/2010 | Hirakawa ............ G06T 1/0007 348/273 |
| 2010/0156780 A1 | 6/2010 | Jacobson et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2010/0283883 A1 * | 11/2010 | Sato .................. G02B 27/283 348/335 |
| 2011/0043543 A1 | 2/2011 | Chen et al. |
| 2011/0063314 A1 | 3/2011 | Chiu et al. |
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2011/0221804 A1 * | 9/2011 | Kohne ................ B41J 2/17593 347/9 |
| 2012/0001957 A1 | 1/2012 | Liu et al. |
| 2012/0076516 A1 | 3/2012 | Rapkin et al. |
| 2012/0076518 A1 * | 3/2012 | Rapkin ............... G03G 15/5079 399/24 |
| 2012/0098740 A1 | 4/2012 | Chiu et al. |
| 2012/0326957 A1 | 12/2012 | Drzaic et al. |
| 2013/0063333 A1 | 3/2013 | Arango et al. |
| 2013/0242378 A1 | 9/2013 | Paolini, Jr. et al. |
| 2013/0249782 A1 | 9/2013 | Wu et al. |
| 2013/0278995 A1 | 10/2013 | Drzaic et al. |
| 2014/0009817 A1 | 1/2014 | Wilcox et al. |
| 2014/0055840 A1 | 2/2014 | Zang et al. |
| 2014/0078576 A1 | 3/2014 | Sprague |
| 2014/0204012 A1 | 7/2014 | Wu et al. |

(56) References Cited

U.S. PATENT DOCUMENTS

| | | |
|---|---|---|
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2014/0362213 A1 | 12/2014 | Tseng |
| 2015/0109355 A1 | 4/2015 | Wang et al. |
| 2015/0118390 A1 | 4/2015 | Rosenfeld et al. |
| 2015/0262255 A1 | 9/2015 | Khajehnouri |
| 2015/0262551 A1 | 9/2015 | Zehner et al. |
| 2015/0268531 A1 | 9/2015 | Wang et al. |
| 2015/0301246 A1 | 10/2015 | Zang et al. |
| 2016/0012131 A1 | 1/2016 | Epstein |
| 2016/0026062 A1 | 1/2016 | Zhang |
| 2016/0048054 A1 | 2/2016 | Danner |
| 2016/0140910 A1 | 5/2016 | Amundson |
| 2016/0148426 A1 | 5/2016 | Son et al. |
| 2016/0323556 A1 | 11/2016 | Luginbuhl et al. |
| 2018/0276790 A1 | 9/2018 | Mantor et al. |
| 2019/0130058 A1 | 5/2019 | Thomas |
| 2019/0188871 A1 | 6/2019 | Fletcher et al. |
| 2020/0059564 A1* | 2/2020 | Case .................. H04N 1/00657 |

OTHER PUBLICATIONS

Ostromoukhov, Victor et al., "Multi-Color and Artistic Dithering", Proceedings of the 26th Annual Conference on Computer Graphics and Interactive Techniques, ACM Press / Addison-Wesley Publishing Co. (1999).

Kolpatzik, Bernd W. et al., "Optimized Universal Color Palette Design for Error Diffusion", Journal of Electronic Imaging, vol. 4, No. 2, pp. 131-142 (Apr. 1995).

Federal Institute of Industrial Property; PCT/US2017/032148; International Search Report and Written Opinion Russian Federation; dated Sep. 14, 2017.

European Patent Office, EP Appl. No. 17803278.5, European Search Report, dated May 3, 2019.

* cited by examiner

SYSTEM FOR RENDERING COLOR IMAGES

REFERENCE TO RELATED APPLICATIONS

This application is a continuation of application Ser. No. 16/731,160 filed Dec. 31, 2019, to be issued as U.S. Pat. No. 10,771,652, which is a continuation of application Ser. No. 16/280,306, filed Feb. 20, 2019, now U.S. Pat. No. 10,554,854, which is a continuation of application Ser. No. 15/592,515, filed May 11, 2017, now U.S. Pat. No. 10,270,939, which claims benefit of provisional Application Ser. No. 62/340,803, filed May 24, 2016.

This application is also related to application Ser. No. 14/277,107, filed May 14, 2014 (Publication No. 2014/0340430, now U.S. Pat. No. 9,697,778, issued Jul. 4, 2017); application Ser. No. 14/866,322, filed Sep. 25, 2015 (Publication No. 2016/0091770); U.S. Pat. No. 9,383,623, issued Jul. 5, 2016 and U.S. Pat. No. 9,170,468, issued Oct. 27, 2015. Other related applications and patent will be discussed below. The entire contents of these copending applications and patent (which may hereinafter be referred to the "ECD" patents), and of all other U.S. patents and published and copending applications mentioned below, are herein incorporated by reference.

BACKGROUND OF INVENTION

This invention relates to a method for rendering color images. More specifically, this invention relates to a method for half-toning color images in situations where a limited set of primary colors are available, and this limited set may not be well structured. The method of the present invention is particularly, although not exclusively, intended for use with color electrophoretic displays Half-toning has been used for many decades in the printing industry to represent gray tones by covering a varying proportion of each pixel of white paper with black ink. Similar half-toning schemes can be used with CMY or CMYK color printing systems, with the color channels being varied independently of each other.

However, there are many color systems in which the color channels cannot be varied independently of one another, in as much as each pixel can display any one of a limited set of primary colors (such systems may hereinafter be referred to as "limited palette displays" or "LPD's"); the ECD patent color displays are of this type. To create other colors, the primaries must be spatially dithered to produce the correct color sensation. It is known to effect such spatial dithering by using, for any desired color, only the primary colors at the vertices of a tetrahedron which contains the desired color; see, for example:

Arad, N., Shaked, D., Baharav, Z., & Lin, Q. (1999). Barycentric Screening and Ostromoukhov, Victor, and Roger D. Hersch. "Multi-color and artistic dithering." *Proceedings of the 26th annual conference on Computer graphics and interactive techniques*. ACM Press/Addison-Wesley Publishing Co., 1999.

Both these documents effect dithering by means of a threshold-array based screening method, which is a simple dithering method that has been found not to give good results in ECD patent displays.

Standard dithering algorithms such as error diffusion algorithms (in which the "error" introduced by printing one pixel in a particular color which differs from the color theoretically required at that pixel is distributed among neighboring pixels so that overall the correct color sensation is produced) can be employed with limited palette displays. However, such standard algorithms are typically intended for use with a limited palette which is "well structured", in the sense that the distances between the primary colors are substantially constant. There is considerable literature on the problems of designing optimal color palettes that perform well with error diffusion; see, for example:

Kolpatzik, Bernd W., and Charles A. Bouman. "Optimized Universal Color Palette Design for Error Diffusion." *Journal of Electronic Imaging* 4.2 (1995): 131-143.

However, in ECD and similar limited palette displays, in which the limited palette is defined by the colors capable of being generated by the system, the limited palette may not be well structured, i.e., the distances between the various primaries in the color space may differ greatly from one another.

FIG. 1 of the accompanying drawings is a schematic flow diagram of a prior art palette based error diffusion method, generally designated 100. At input 102, color values $x_{i,j}$ are fed to a processor 104, where they are added to the output of an error filter 106 (described below) to produce a modified input $u_{i,j}$. The modified inputs $u_{i,j}$ are fed to a quantizer 108, which also receives details of the palette $\{P_k\}$ of the output device. The quantizer 108 determines the appropriate color for the pixel being considered, given by:

$$y_{i,j} = \underset{P_k}{\operatorname{argmin}} \|u_{i,j} - P_k\|$$

and feeds to appropriate colors to the device controller (or stores the color values for later transmission to the device controller). Both the modified inputs $u_{i,j}$ and the outputs $y_{i,j}$ are fed to a processor 110, which calculates error values $e_{i,j}$, where:

$$e_{i,j} = u_{i,j} - y_{i,j}$$

The error values $e_{i,j}$ are then fed to the error filter 106, which serves to distribute the error values over one or more selected pixels. For example, if the error diffusion is being carried out on pixels from left to right in each row and from top to bottom in the image, the error filter 106 might distribute the error over the next pixel in the row being processed, and the three nearest neighbors of the pixel being processed in the next row down. Alternatively, the error filter 106 might distribute the error over the next two pixels in the row being processed, and the nearest neighbors of the pixel being processed in the next two rows down. It will be appreciated that the error filter need not apply the same proportion of the error to each of the pixels over which the error is distributed; for example when the error filter 106 distributes the error over the next pixel in the row being processed, and the three nearest neighbors of the pixel being processed in the next row down, it may be appropriate to distribute more of the error to the next pixel in the row being processed and to the pixel immediately below the pixel being processed, and less of the error to the two diagonal neighbors of the pixel being processed.

Unfortunately, it has been found that if one attempts to use conventional error diffusion methods such as that shown in FIG. 1 to ECD and similar limited palette displays, severe artifacts are generated which may render the resultant images unusable. For example, in one type of artifact, (hereinafter called a "transient" artifact) when stepping from one input color to a next very different color, the spatial transient can be so long that the output never settles to the correct average even across the size of object being rendered. In another type of artifact (hereinafter called a "pattern jumping" artifact), for a constant color input image, the output jumps between two different sets of primaries at a seemingly random position in the image. Although both sets of primaries should ideally produce output close to the color being requested, the resultant output is not robust because small changes in the system can cause these switching between the two sets and the texture change at such a jump is also noticeable and unpleasant.

The present invention seeks to provide a method of rendering color images which can be used with palettes which are not well structured, and may be large, without producing transient and pattern jumping artifacts to which standard error diffusion methods are susceptible.

SUMMARY OF THE INVENTION

In one aspect, this invention provides a method of rendering an image on a display, the method comprising:
- receiving input data representing the color of a pixel to be rendered;
- combining the input data with error data generated from a least one pixel previously rendered to form modified input data;
- determining in a color space the simplex enclosing the modified input data, and the display primary colors associated with the simplex;
- converting the modified image data to barycentric coordinates based upon the simplex and setting output data to the primary having the largest barycentric coordinate;
- calculating the difference between the modified input data and the output data for the pixel and thereby generating error data for the pixel;
- applying the error data thus generated to at least one later-rendered pixel; and
- supplying the output data for a plurality of pixels to the display and thereby rendering the image on the display.

In one form of this process, the modified input data is tested to determine whether it is within the color gamut of the display and, if the modified input data is outside this color gamut, the modified input data is further modified by being projected on to the color gamut. This projection may be effected towards the neutral axis of the color space along lines of constant lightness and hue. Alternatively, the projection may be effected towards to the color represented by the input data for the pixel until the gamut boundary is reached. Typically, the color space used will be three-dimensional, so that the simplex will be a tetrahedron. The error data may, and typically will be, spread over more than one pixel. For example, if the method of the present invention is effected using a top-to-bottom and left-to-right order of pixel processing, the error data will normally be spread over at least the pixel to the right of, and the pixel below, the pixel being rendered. Alternatively, the error data may be spread over the pixel to the right of, and the three pixels below and adjacent the pixel being rendered. Especially, in the latter case, it is not necessary that an equal proportion of the error data be spread over all the pixels to which it is dispersed; for example, when the error is spread over the pixel to the right of, and the three adjacent pixels in the next row, it may be advantageous to assign more of the error data to the two pixels which share an edge with the pixel being rendered, as opposed to the two pixels which only share a vertex.

The present invention extends to an apparatus comprising a display device having a plurality of pixels, each of which is arranged to display any one of a plurality of primary colors, and a computing device capable of carrying out the method of the present invention and supplying its output data to the display device, thereby causing the display device to display an image.

The present invention also extends to a non-transitory computer storage medium comprising instructions that when executed by a processor cause the processor to carry out the method of the present invention.

DETAILED DESCRIPTION

The present invention is based upon the recognition that the transient and pattern jumping artifacts discussed above result from the fact that the quantizer (108 in FIG. 1) has available to it an under-constrained list of primaries. In a three dimensional color space, any color in the device gamut can be rendered by dithering only four primaries, and the present invention is based upon constraining the choice of primaries in an appropriate way to ensure that only a restricted set of primaries are used during quantization.

The subset of primaries that can used in a dither pattern to represent a given color is not unique; for example in a three dimensional color space, any set of four or more primaries which define a volume in the color space enclosing the given color can be used in a dither pattern. Even if one restricts the subset of primaries to only four, any set of four primaries which define a tetrahedron enclosing the given color can be used. However, to avoid pattern jumping artifacts, the assignment of subsets of primaries to particular colors should be made in such a way that any parametric path through color space results in a smooth change in proportions of the various primaries used with respect to the parameter. This can be achieved by decomposing the total gamut of the system (the convex hull of all the primaries) into tetrahedra with primaries as vertices and then assigning to each color to be rendered the subset of primaries corresponding to the vertices of its enclosing tetrahedron. This may be effected by Delaunay triangularization, which decomposes the convex hull of the primaries into a set of tetrahedra, the circumspheres of which do not enclose any vertex from another tetrahedron. This is convenient, but other decompositions of the color gamut may also be beneficial; for example, to reduce halftone graininess, the subsets of primaries could be chosen to have low variation in lightness. It will be appreciated that the decomposition methods can be generalized to color spaces of any number of dimensions by the use of the appropriate simplexes for the numbers of dimensions involved instead of using tetrahedra in a three dimensional space.

Figure 1:
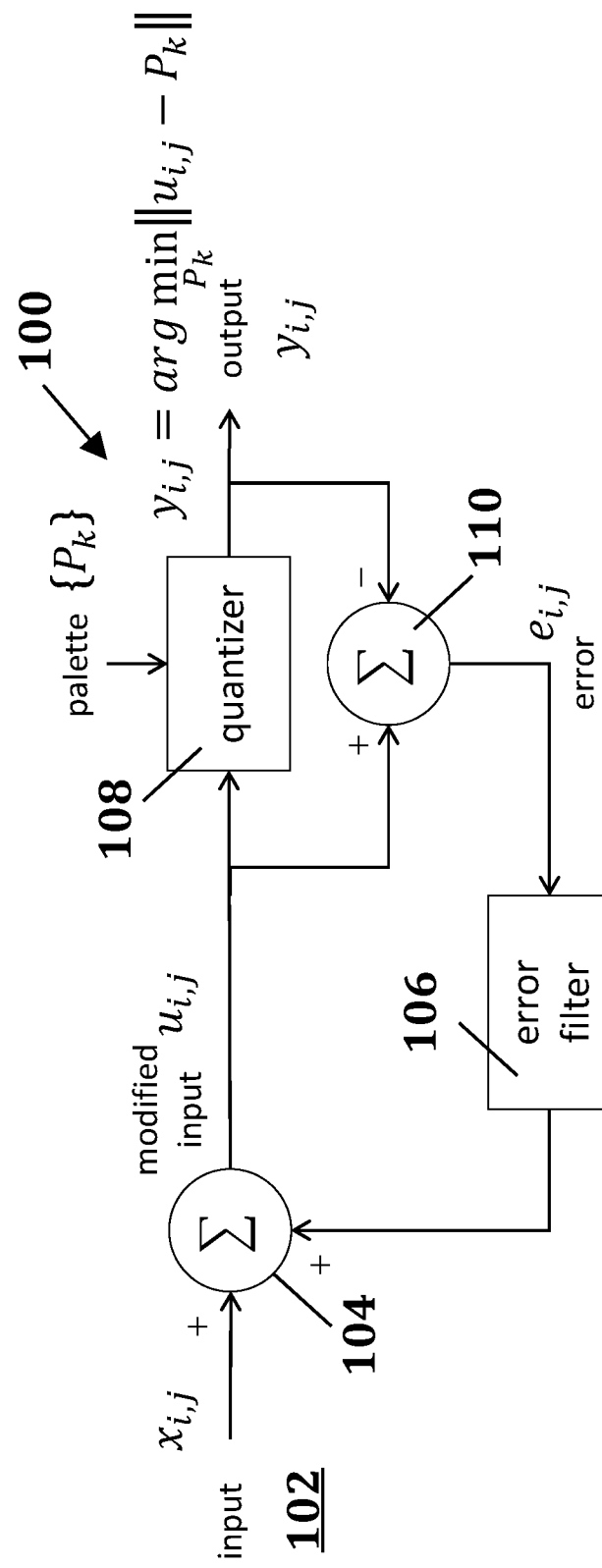
FIG. 1 of the accompanying drawings is a schematic flow diagram of a prior art palette based error diffusion method.
Figure 2:
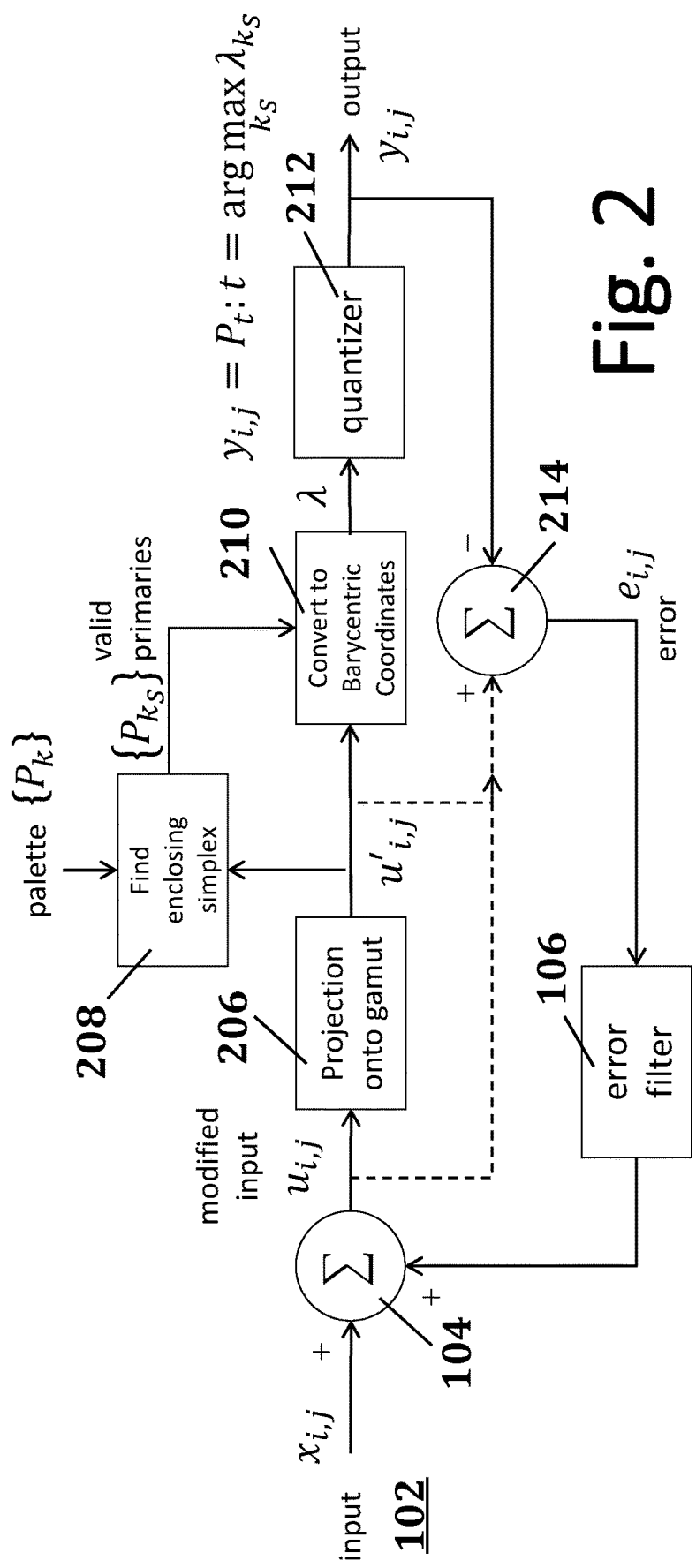
FIG. 2 is a schematic flow diagram, similar to that of FIG. 1, but illustrating a preferred method of the present invention.

A preferred embodiment of the process of the invention is illustrated in FIG. 2 of the accompanying drawings, which is a schematic flow diagram generally similar to FIG. 1. As in the prior art method illustrated in FIG. 1, the method illustrated in FIG. 2 begins at an input 102, where color values $x_{i,j}$ are fed to a processor 104, where they are added to the output of an error filter 106 to produce a modified input $u_{i,j}$. (Again, this description assumes that the input values $x_{i,j}$ are such that the modified inputs $u_{i,j}$ are within the color gamut of the device.) If this is not the case, some preliminary modification of the inputs or modified inputs may be necessary to ensure that they lie within the appropriate color gamut.) The modified inputs $u_{i,j}$ are, however, fed to a gamut projector 206.

The gamut projector 206 is provided to deal with the possibility that, even though the input values $x_{i,j}$ are within the color gamut of the system, the modified inputs $u_{i,j}$ may not be, i.e., that the error correction introduced by the error filter 106 may take the modified inputs $u_{i,j}$ outside the color gamut of the system. In such a case, it would not be possible to choose a subset of primaries for the modified input $u_{i,j}$ since it would lie outside all defined tetrahedra. Although other ways of this problem can be envisioned, the only one which has been found to give stable results is to project the modified value $u_{i,j}$ on to the color gamut of the system before further processing. This projection can be done in numerous ways; for example, projection may be effected towards the neutral axis along constant lightness and hue. However, the preferred projection method is to project towards the input color until the gamut boundary is reached.

The projected input $u'_{i,j}$ values are fed to a simplex finder 208, which returns the appropriate subset of primaries $\{P_{ks}\}$, to a processor 210, which also received the projected input $u'_{i,j}$ values, and converts them to barycentric coordinates of the tetrahedron (or other simplex) defined by the subset of primaries $\{P_{ks}\}$. Although it might appear that the subset of primaries $\{P_{ks}\}$ should be based on those assigned to the input pixel color $x_{i,j}$, this will not work; the subset of primaries must be based upon the projected input $u'_{i,j}$ values. The output $\lambda$ of processor 210 is supplied to a quantizer 212, the function of which is very different from that of the quantizer 108 shown in FIG. 1. Instead of performing conventional error diffusion, the quantizer 212 chooses the primary associated with the largest barycentric coordinate. This is equivalent to a barycentric thresholding with the threshold (⅓, ⅓, ⅓)(see the aforementioned Arad et al. document), which is not equivalent to the minimum distance determination carried out by quantizer 108 in FIG. 1. The output $y_{i,j}$ from quantizer 212 is then sent to the device controller in the usual manner, or stored.

The output $y_{i,j}$ values, and either the modified input values $u_{i,j}$ or the projected input values $u'_{i,j}$ (as indicated by the broken lines in FIG. 2), are supplied to a processor 214, which calculates error values $e_{i,j}$ by:

$$e_{i,j} = u'_{i,j} - y_{i,j} \text{ or}$$

$$e_{i,j} = u_{i,j} - y_{i,j}$$

(depending upon which set of input values are being used) and passes this error signal on to the error filter 106 in the same way as described above with reference to FIG. 1.

In theory, it would appear that the error values $e_{i,j}$ should be calculated using the original modified input values $u_{i,j}$ rather than the projected input values $u'_{i,j}$, since it is the former which accurately represents the difference between the desired and actual colors of the pixel; in effect, using the latter values "throws away" the error introduced by the projection step. Empirically, it has been found that which set of input values is used does not have a major effect on the accuracy of the color representation. Furthermore, in deciding whether to use the input values before or after the projection in the error calculation, it is necessary to take account of the type of projection effected by the gamut projector 206. Some types of projection, for example projection along lines of constant hue and lightness, provide a continuous and fixed extension of the quantizer domain boundaries to the out-of-gamut volume, and thus permit the use of the unprojected input values in the error calculation without risk of instability in the output values. Other types of projection do not provide both a continuous and fixed extension of the quantizer domain boundaries; for example, projection towards the input color until the gamut boundary is reached fails to provide a fixed extension of the quantizer domain boundaries but instead the quantizer domains change with input values, and in these cases the projected input values should be used to determine the error value, since using the unprojected values could result in an unstable method in which error values could increase without limit.

From the foregoing, it will be seen that the present invention can provide improved color in limited palette displays with fewer artifacts than are obtained using conventional error diffusion techniques. The present invention may be used in display systems capable of displaying a continuum of colors (or at least a very large number of colors) but in which the available primaries are not evenly spread throughout the color gamut; for example interference based displays which control a gap width can display a large number of colors at each pixel, but with a pre-determined structure among the primaries, which lie on a one-dimensional manifold. The present invention may also be used with electrochromic displays.

For further details of color display systems to which the present invention can be applied, the reader is directed to the aforementioned ECD patents (which also give detailed discussions of electrophoretic displays) and to the following patents and publications: U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A system for producing a color image, the system comprising:

a display device having a plurality of pixels, each of which is arranged to display any one of a plurality of primary colors; and a computing device in communication with the display device, the computing device being configured to render color images on the display device by:

receiving input data representing colors to be displayed at each of the plurality of pixels;

combining the input data with error data to create modified input data;

determining in a color space a simplex enclosing the modified input data, wherein the vertices of the simplex comprise a subset of the display primary colors that is smaller than the complete set of display primary colors, hereafter a simplex primary color;

setting output data for a first pixel corresponding to one of the simplex primary colors; and calculating a difference between the modified input data for the first pixel and the output data for the first pixel, thereby generating new error data for the first pixel;

combining input data for a second pixel with the new error data for the first pixel to create new modified input data for the second pixel;

determining in the color space a new simplex enclosing the modified input data and the new modified input data for the second pixel, wherein the vertices of the new simplex comprise a subset of the display primary colors that is smaller than the complete set of display primary colors, hereafter a new simplex primary color; and setting output data for the second pixel corresponding to one of the new simplex primary colors.

2. The system of claim 1, wherein the computing device evaluates the modified input data to determine whether it is within a measured color gamut of the display and, if the modified input data is outside the measured color gamut of the display, further modifies the modified input data by projecting the modified input data on to the measured color gamut of the display to produce projected input data which are used in place of the modified input data.

3. The system of claim 2, wherein the projection of the modified input data is effected towards the neutral axis of the color space along a line of constant lightness and hue.

4. The system of claim 2, wherein the projected input data is used for the generation of the error data.

5. The system of claim 1, wherein the color space is three-dimensional so that the simplex is a tetrahedron.

6. The system of claim 1, wherein the new error data for the first pixel is used in the processing of input data for a third pixel.

7. The system of claim 1, wherein the display device is an electrophoretic display.

8. The system of claim 1, wherein the display device includes a controller, and the computing device sends the output data for the first pixel and the output data for the second pixel to the controller.

* * * * *